(12) United States Patent
Togashi (10) Patent No.: US 8,125,760 B2
(45) Date of Patent: Feb. 28, 2012

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 306 days.

(21) Appl. No.: 12/636,393

(22) Filed: Dec. 11, 2009

(65) Prior Publication Data

US 2010/0232086 A1    Sep. 16, 2010

(30) Foreign Application Priority Data

Mar. 13, 2009 (JP) .................................. 2009-061552

(51) Int. Cl.
*H01G 4/00* (2006.01)

(52) U.S. Cl. ..................... 361/303; 361/306.3; 361/311; 361/321.2; 361/328; 361/308.1

(58) Field of Classification Search .................. 361/303, 361/306.3, 311, 321.2, 328, 308.1, 305, 302, 361/312
See application file for complete search history.

(56) References Cited

U.S. PATENT DOCUMENTS

| | | | | |
|---|---|---|---|---|
| 5,822,174 A * | 10/1998 | Yamate et al. | ................ | 361/302 |
| 6,661,312 B2 * | 12/2003 | Orihara | ........................ | 333/185 |
| 6,914,767 B2 * | 7/2005 | Togashi et al. | ................ | 361/303 |
| 7,019,957 B2 * | 3/2006 | Togashi et al. | ................ | 361/303 |
| 7,046,500 B2 * | 5/2006 | Lee et al. | ...................... | 361/303 |
| 7,646,586 B2 | 1/2010 | Togashi | | |
| 7,667,950 B2 * | 2/2010 | Togashi | .................... | 361/306.3 |
| 2008/0174934 A1 | 7/2008 | Togashi | | |

FOREIGN PATENT DOCUMENTS

| | | |
|---|---|---|
| JP | A-2008-71811 | 3/2008 |
| KR | 10-2004-0081382 | 9/2004 |
| KR | 10-2007-0090112 | 9/2007 |

* cited by examiner

*Primary Examiner* — Nguyen T Ha
*Assistant Examiner* — Hung Dang
(74) *Attorney, Agent, or Firm* — Oliff & Berridge, PLC (57) ABSTRACT

There are a plurality of types of first internal electrodes and each type of first internal electrode includes a first main electrode portion and a first lead portion. A second internal electrode includes a plurality of second main electrode portions forming respective capacitance components with the respective types of first internal electrodes, an interconnection portion connecting between each pair of second main electrode portions, and a second lead portion. Positions of the first lead portions of the respective types of first internal electrodes are different from each other and distances from the first lead portions of the respective types of first internal electrodes to the second lead portion are different from each other. The width of the interconnection portion is smaller than the width of at least one second main electrode portion out of the plurality of second main electrode portions.

4 Claims, 11 Drawing Sheets

MULTILAYER CAPACITOR

BACKGROUND OF THE INVENTION

1. Field of the Invention

The present invention relates to a multilayer capacitor.

2. Related Background Art

There is a known multilayer capacitor having a laminated body wherein first internal electrodes and second internal electrodes are alternately laminated with a dielectric layer in between, a first terminal electrode disposed on one end side of the laminated body, and a second terminal electrode disposed on the other end side of the laminated body, in which each first internal electrode is provided with a first lead portion connected to the first terminal electrode and in which each second internal electrode is provided with a second lead portion connected to the second terminal electrode (e.g., cf. Japanese Patent Application Laid-open No. 2008-71811). The multilayer capacitor described in the foregoing Laid-open No. 2008-71811 has plural types of first internal electrodes, positions of the first lead portions of the respective types of first internal electrodes are different from each other, and distances from the first lead portions of the respective types of first internal electrodes to the second lead portion are different from each other.

SUMMARY OF THE INVENTION

With the multilayer capacitor described in the foregoing Laid-open No. 2008-71811, low impedance can be certainly achieved over a wide band. In recent years, however, there are demands for implementation of low impedance over a wider band.

It is thus an object of the present invention to provide a multilayer capacitor capable of certainly achieving low impedance over a wider band.

A multilayer capacitor according to the present invention is a multilayer capacitor comprising: a laminated body in which a first internal electrode and a second internal electrode are laminated as opposed to each other with a dielectric layer in between; a first terminal electrode disposed on one end side of the laminated body; and a second terminal electrode disposed on the other end side of the laminated body, wherein the first internal electrode comprises a plurality of types of first internal electrodes, and each type of first internal electrode includes a first main electrode portion, and a first lead portion extending from the first main electrode portion to one end of the laminated body and connected directly to the first terminal electrode, wherein the second internal electrode includes a plurality of second main electrode portions forming respective capacitance components with the respective types of first internal electrodes, an interconnection portion connecting between each pair of the second main electrode portions, and a second lead portion extending from one second main electrode portion out of the plurality of second main electrode portions to the other end of the laminated body and connected directly to the second terminal electrode, wherein positions of the first lead portions of the respective types of first internal electrodes are different from each other and distances from the first lead portions of the respective types of first internal electrodes to the second lead portion are different from each other, and wherein a width of the interconnection portion is smaller than a width of at least one second main electrode portion out of the plurality of second main electrode portions.

Since the multilayer capacitor of the present invention comprises the plurality of types of first internal electrodes, there are a plurality of capacitance components formed by the first internal electrodes (first main electrode portions), the second internal electrode (second main electrode portions), and the dielectric layer. In general, for controlling the self-resonant frequency of a capacitor, it is necessary to adjust the equivalent series inductance (ESL) or the capacitance of the capacitor. At this case, the equivalent series inductance of the capacitor becomes smaller with decreasing distance between the first lead portion of the first internal electrode and the second lead portion of the second internal electrode. As a consequence, the self-resonant frequency of the capacitor becomes higher. Since in the present invention the distances from the first lead portions of the respective types of first internal electrodes to the second lead portion of the second internal electrode are different from each other, the equivalent series inductances of the respective capacitance components corresponding to the respective types of first internal electrodes are different, and as a result, the self-resonant frequencies of the respective capacitor portions are different. Therefore, the multilayer capacitor has a plurality of self-resonant frequencies. This permits us to surely obtain the multilayer capacitor in which the impedance is low over a wide band. At this case, the number of self-resonant frequencies of the multilayer capacitor becomes larger with increase in the number of types of first internal electrodes, whereby low impedance is achieved over a wider band.

In the present invention, the second internal electrode includes the interconnection portion connecting between the second main electrode portions and the width of the interconnection portion is smaller than the width of at least one second main electrode portion out of the plurality of second main electrode portions; therefore, the second main electrode portions are magnetically separated from each other and the self-resonant frequencies by the respective capacitance components are also further separated. As a result, the impedance is lowered over a wider band.

Preferably, at least one type of first internal electrode further includes a first intermediate electrode portion which is not directly connected to the first terminal electrode, and the first main electrode portion and the first intermediate electrode portion are arranged with the dielectric layer in between so that a plurality of series-connected capacitance components are formed between the first main electrode portion and the first intermediate electrode portion. In this case, the capacitance component formed by the at least one type of first internal electrode and the second internal electrode is divided into a plurality of series-connected capacitance components. As a result, the impedance is lowered over a much wider band.

Preferably, the laminated body comprises a third internal electrode laminated therein, the third internal electrode including a third main electrode portion, a third lead portion extending from the third main electrode portion to the other end of the laminated body and connected directly to the second terminal electrode, and a third intermediate electrode portion not directly connected to the second terminal electrode, and the third main electrode portion and the third intermediate electrode portion are arranged with the dielectric layer in between so that a plurality of series-connected capacitance components are formed between at least one type of first internal electrode and the third main electrode portion. In this case, a plurality of series-connected capacitance components are formed between the first internal electrode and the third internal electrode. As a result, the impedance is lowered over a much wider band.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

The preferred embodiments of the present invention will be described below in detail with reference to the accompanying drawings. In the description identical elements or elements with identical functionality will be denoted by the same reference symbols, without redundant description.

First Embodiment

Figure 1:
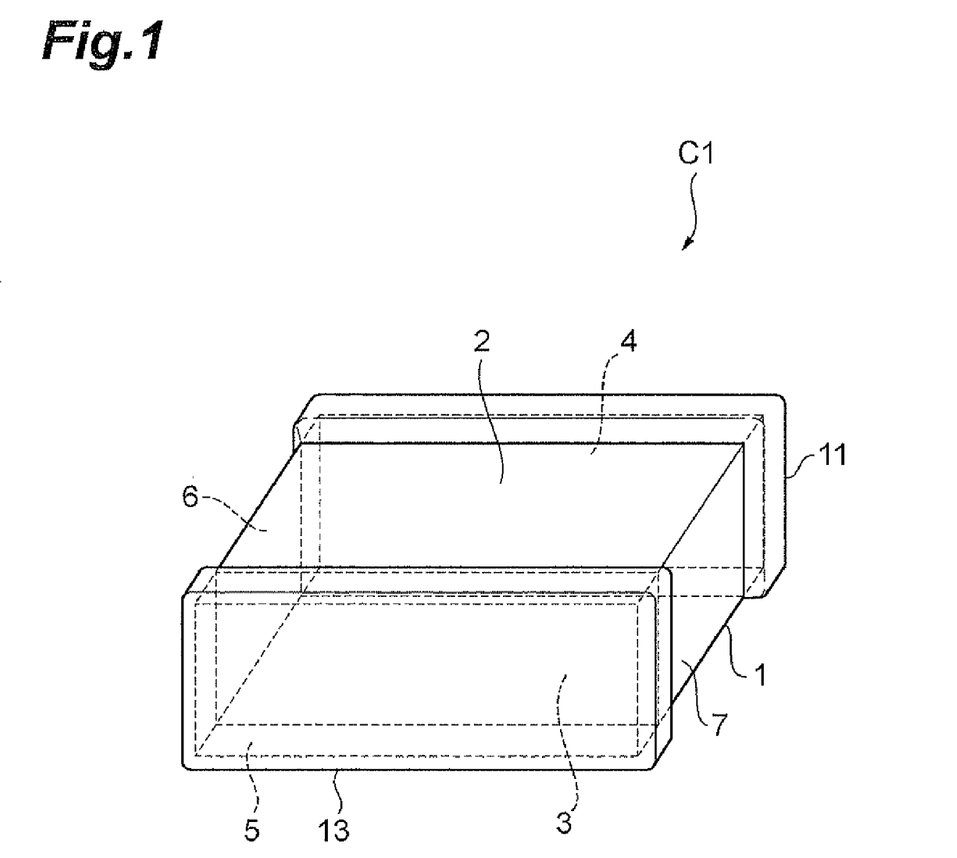
FIG. 1 is a schematic perspective view of a multilayer capacitor according to the first embodiment.
Figure 2:
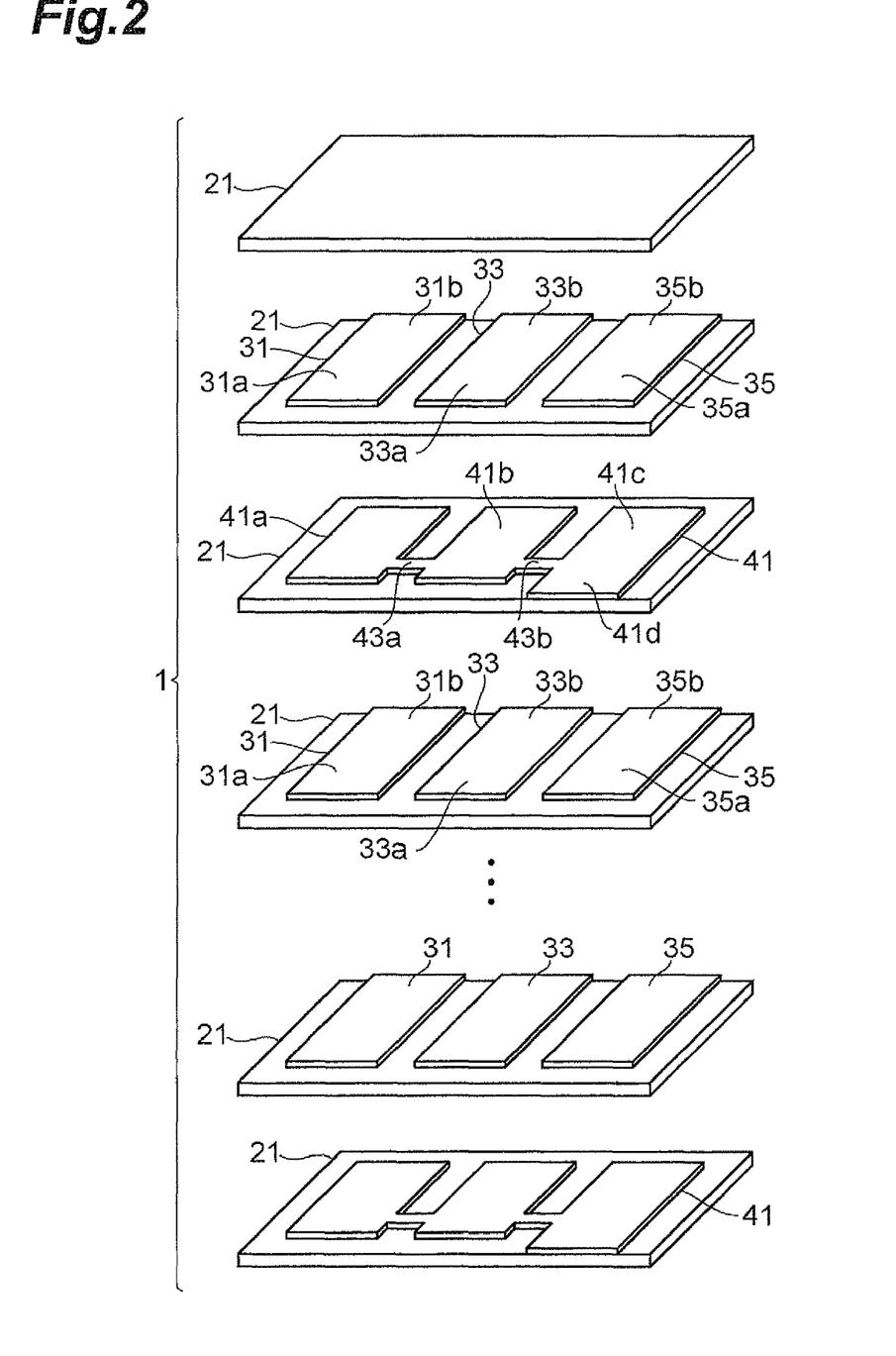
FIG. 2 is an exploded perspective view of a capacitor element body included in the multilayer capacitor according to the first embodiment.
Figure 3:
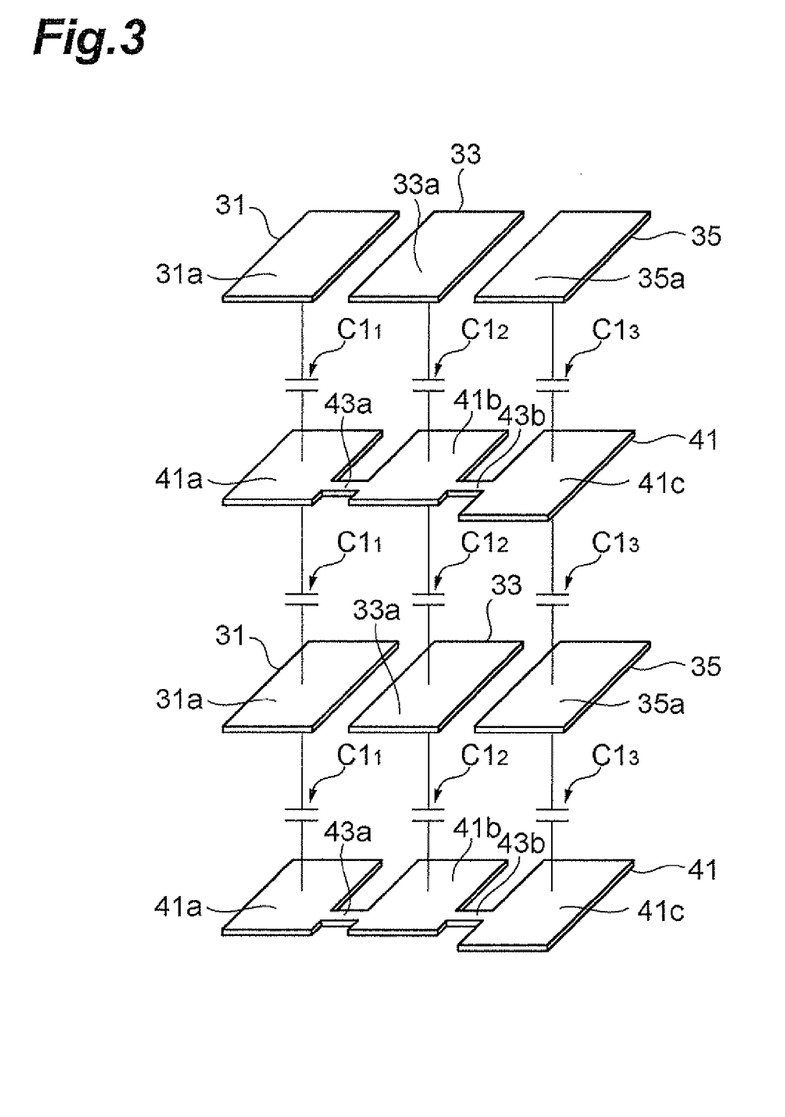
FIG. 3 is a drawing for explaining capacitance components formed by first internal electrodes and second internal electrodes.

First, a configuration of a multilayer capacitor C1 according to the first embodiment will be described on the basis of FIGS. 1 to 3. FIG. 1 is a schematic perspective view of the multilayer capacitor according to the first embodiment. FIG. 2 is an exploded perspective view of a capacitor element body included in the multilayer capacitor according to the first embodiment. FIG. 3 is a drawing for explaining capacitance components formed by first internal electrodes and second internal electrodes.

The multilayer capacitor C1, as shown in FIG. 1, has a capacitor element body 1 as a laminated body, a first terminal electrode 11 disposed on one end side of the capacitor element body 1, and a second terminal electrode 13 disposed on the other end side of the capacitor element body 1. The capacitor element body 1 is of a rectangular parallelepiped shape and includes a first principal face 2 and a second principal face 3 of a rectangular shape opposed to each other, a first end face 4 and a second end face 5 opposed to each other, and a third end face 6 and a fourth end face 7 opposed to each other. The first end face 4 and the second end face 5 extend in the long-side direction of the first principal face 2 and the second principal face 3 so as to connect between the first principal face 2 and the second principal face 3. The third end face 6 and the fourth end face 7 extend in the short-side direction of the first principal face 2 and the second principal face 3 so as to connect between the first principal face 2 and the second principal face 3.

The first terminal electrode 11 is arranged on the first end face 4 of the capacitor element body 1. The first terminal electrode 11 is formed so as to cover the first end face 4 and up onto the first and second principal faces 2, 3 and the third and fourth end faces 6, 7. The second terminal electrode 13 is arranged on the second end face 5 of the capacitor element body 1. The second terminal electrode 13 is formed so as to cover the second end face 5 and up onto the first and second principal faces 2, 3 and the third and fourth end faces 6, 7. The first and second terminal electrodes 11, 13 are formed, for example, by applying an electroconductive paste containing an electroconductive metal powder and glass frit, onto the corresponding exterior surfaces of the capacitor element body 1 and firing it. It is sometimes the case that a plated layer is formed on the fired electrodes as occasion may demand.

The capacitor element body 1, as shown in FIG. 2, has a plurality of dielectric layers 21, a plurality of first internal electrodes 31, 33, and 35, and second internal electrodes 41. Each dielectric layer 21 extends in directions parallel to the first and second principal faces 2, 3 and the dielectric layers 21 are laminated in the direction in which the first and second principal faces 2, 3 are opposed to each other. The capacitor element body 1 has a structure in which the plurality of first internal electrodes 31, 33, 35 and the second internal electrodes 41 are laminated as opposed to each other with the dielectric layer 21 in between. Each dielectric layer 21 is comprised, for example, of a sintered body of a ceramic green sheet containing a dielectric ceramic. In a practical multilayer capacitor C1, the dielectric layers 21 are so integrated that no boundary can be visually recognized between the dielectric layers 21. The first internal electrodes 31, 33, 35 and the second internal electrodes 41 are alternately arranged in the lamination direction of the dielectric layers 21, i.e., in the direction in which the first and second principal faces 2, 3 are opposed, in the capacitor element body 1.

Each set of first internal electrodes 31, 33, and 35 are located in an identical layer, while having a space between them. The first internal electrode 33 is located between the first internal electrodes 31 and 35. The plurality of first internal electrodes 31, 33, and 35 are arranged in an order of the first internal electrode 31, the first internal electrode 33, and the first internal electrode 35 in a direction from the third end face 6 to the fourth end face 7. Each first internal electrode 31, 33, or 35 is made of an electroconductive material (e.g., base metal Ni or the like) which is usually used for internal electrodes of multilayer electric elements. Each first internal electrode 31, 33, or 35 is comprised of a sintered body of an electroconductive paste containing the aforementioned electroconductive material. Each first internal electrode 31, 33, or 35 includes a first main electrode portion 31a, 33a, or 35a of a rectangular shape, and a first lead portion 31b, 33b, or 35b extending from the first main electrode portion 31a, 33a, or 35a to the first end face 4 so that its end is exposed in the first end face 4.

Each first lead portion 31b, 33b, or 35b extends from an end of the corresponding first main electrode portion 31a, 33a, or 35a on the first end face 4 side to the first end face 4. The first main electrode portion 31a, 33a, or 35a and the first lead portion 31b, 33b, or 35b are integrally formed. The first terminal electrode 11 is formed so as to cover all the exposed portions of the respective first lead portions 31b, 33b, and 35b in the first end face 4 and each first lead portion 31b, 33b, or 35b is directly connected to the first terminal electrode 11. This makes the first internal electrodes 31, 33, and 35 physically and electrically connected to the first terminal electrode 11.

The second internal electrodes 41 are located in layers different from the layers of the first internal electrodes 31, 33, and 35. Each second internal electrode 41 is opposed to the first internal electrodes 31, 33, and 35 (first main electrode portions 31a, 33a, and 35a) with the dielectric layer 21 in between. The second internal electrodes 41 are also made of the aforementioned electroconductive material which is usually used for internal electrodes of multilayer electric elements. Each second internal electrode 41 is comprised of a sintered body of an electroconductive paste containing the aforementioned electroconductive material. Each second internal electrode 41 includes second main electrode portions 41a, 41b, and 41c of a rectangular shape, and a second lead portion 41d extending from the second main electrode portion 41c to the second end face 5 so that its end is exposed in the second end face 5.

The second main electrode portion 41b is located between the second main electrode portions 41a and 41c. The second main electrode portions 41a, 41b, and 41c are arranged in an order of the second main electrode portion 41a, the second main electrode portion 41b, and the second main electrode portion 41c in the direction from the third end face 6 to the fourth end face 7. The second lead portion 41d extends from an end of the second main electrode portion 41c on the second end face 5 side to the second end face 5. The second main electrode portions 41a, 41b, 41c and the second lead portion 41d are integrally formed. The second terminal electrode 13 is formed so as to cover all the exposed portions of the respective second lead portions 41d in the second end face 5 and the second lead portions 41d are directly connected to the second terminal electrode 13.

Each second internal electrode 41 further includes interconnection portions 43a and 43b. The interconnection portion 43a connects between the second main electrode portion 41a and the second main electrode portion 41b. More specifically, the interconnection portion 43a connects a part of the second main electrode portion 41a nearer to the second end face 5, to a part of the second main electrode portion 41b nearer to the second end face 5. The interconnection portion 43b connects between the second main electrode portion 41b and the second main electrode portion 41c. More specifically, the interconnection portion 43b connects a part of the second main electrode portion 41b nearer to the second end face 5, to a part of the second main electrode portion 41c nearer to the second end face 5. The interconnection portions 43a, 43b are formed integrally with the second main electrode portions 41a, 41b, 41c and the second lead portion 41d. This makes each second internal electrode 41 physically and electrically connected to the second terminal electrode 13. Each interconnection portion 43a or 43b is opposed to none of the first internal electrodes 31, 33, and 35 and thus has no mutually overlapping region with the first internal electrodes 31, 33, and 35 when viewed from the lamination direction of the dielectric layers 21 (the direction in which the first and second principal faces 2, 3 are opposed).

The width of the interconnection portions 43a, 43b is smaller than the width of each second main electrode portion 41a, 41b, or 41c. The width of the interconnection portions 43a, 43b is a length (width) of the interconnection portions 43a, 43b in the direction in which the first end face 4 and the second end face 5 are opposed and the width of each second main electrode portion 41a, 41b, or 41c is also a length (width) of each second main electrode portion 41a, 41b, or 41c in the direction in which the first end face 4 and the second end face 5 are opposed.

The first main electrode portion 31a of the first internal electrode 31 and the second main electrode portion 41a of the second internal electrode 41 include a region in which they are opposed to each other in the direction in which the first and second principal faces 2, 3 are opposed, with at least one dielectric layer 21 as a part of the capacitor element body 1 in between. The first main electrode portion 31a of the first internal electrode 31 and the second main electrode portion 41a of the second internal electrode 41 have a mutually overlapping region when viewed from the direction in which the first and second principal faces 2, 3 are opposed. Therefore, an overlap portion of the dielectric layer 21 with the first main electrode portion 31a and the second main electrode portion 41a is a region which substantially produces one capacitance component $C1_1$, as shown in FIG. 3. A first internal electrode 31 and a second internal electrode 41 constitute one capacitor.

The first main electrode portion 33a of the first internal electrode 33 and the second main electrode portion 41b of the second internal electrode 41 include a region in which they are opposed to each other in the lamination direction of the dielectric layers 21 with at least one dielectric layer 21 as a part of the capacitor element body 1 in between. The first main electrode portion 33a of the first internal electrode 33 and the second main electrode portion 41b of the second internal electrode 41 also have a mutually overlapping region when viewed from the direction in which the first and second principal faces 2, 3 are opposed. Therefore, an overlap portion of the dielectric layer 21 with the first main electrode portion 33a and the second main electrode portion 41b is a region which substantially produces one capacitance component $C1_2$. A first internal electrode 33 and a second internal electrode 41 constitute one capacitor.

The first main electrode portion 35a of the first internal electrode 35 and the second main electrode portion 41c of the second internal electrode 41 include a region in which they are opposed to each other in the lamination direction of the dielectric layers 21 with at least one dielectric layer 21 as a part of the capacitor element body 1 in between. The first main electrode portion 35a of the first internal electrode 35 and the second main electrode portion 41c of the second internal electrode 41 also have a mutually overlapping region when viewed from the direction in which the first and second principal faces 2, 3 are opposed. Therefore, an overlap portion of the dielectric layer 21 with the first main electrode portion 35a and the second main electrode portion 41c is a region which substantially produces one capacitance component $C1_3$. A first internal electrode 35 and a second internal electrode 41 constitute one capacitor.

Incidentally, where L represents the equivalent series inductance (ESL) of a capacitor and C the capacitance thereof, the self-resonant frequency fr of the capacitor is expressed as follows:

$fr=1/(2\pi(L*C)^{1/2})$.

Therefore, the self-resonant frequency fr of the capacitor can be varied by changing values of the equivalent series inductance L and the capacitance C of the capacitor. At this case, the equivalent series inductance L becomes smaller with decreasing distance between lead portions of two internal electrodes of different polarities, and thus the self-resonant frequency fr becomes higher.

In the multilayer capacitor C1 of the present embodiment, the first internal electrodes 31, 33, and 35 are located in an identical layer and arranged in juxtaposition in the direction from the third end face 6 to the fourth end face 7. Therefore, the first lead portion 31b of the first internal electrode 31, the first lead portion 33b of the first internal electrode 33, and the first lead portion 35b of the first internal electrode 35 are formed at different positions.

There is a relation of D1>D2>D3 among the distance D1 between the first lead portion 31b of the first internal electrode 31 and the second lead portion 41d of the second internal electrode 41 in the capacitance component $C1_1$, the distance D2 between the first lead portion 33b of the first internal electrode 33 and the second lead portion 41d of the second internal electrode 41 in the capacitance component $C1_2$, and the distance D3 between the first lead portion 35b of the first internal electrode 35 and the second lead portion 41d of the second internal electrode 41 in the capacitance component $C1_3$. The distance D1, D2, or D3 between each first lead portion 31b, 33b, or 35b and the second lead portion 41d is a shortest direct distance from a connection point between each first lead portion 31b, 33b, or 35b and the first terminal electrode 11, to a connection point between the second lead portion 41d and the second terminal electrode 13.

Figure 4:
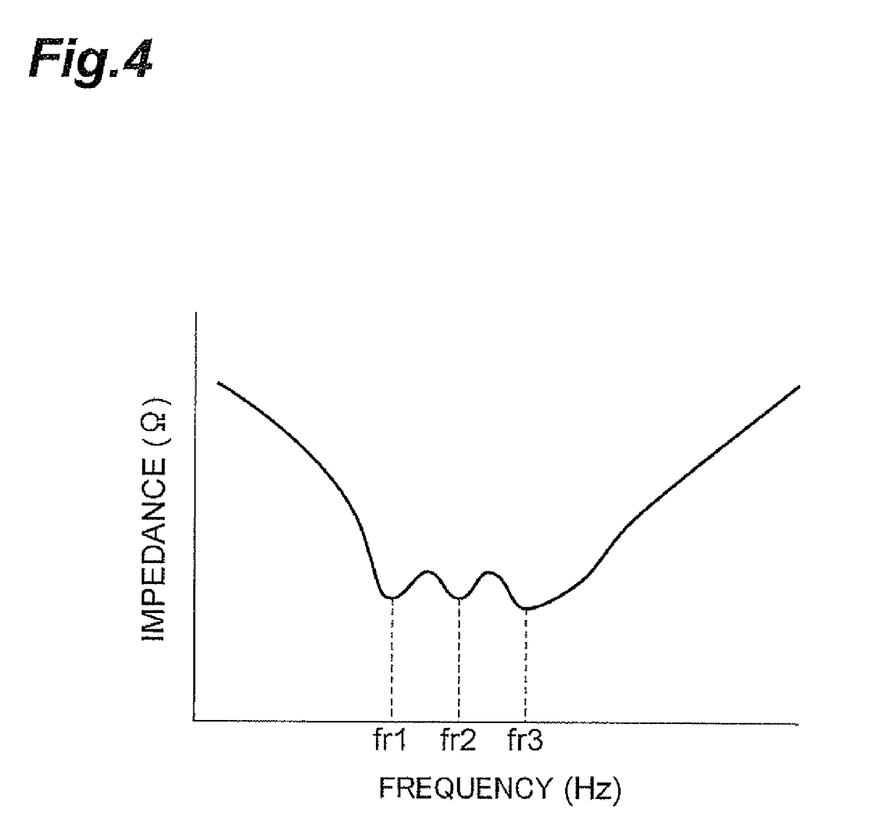
FIG. 4 is a graph showing a frequency characteristic of impedance of the multilayer capacitor according to the first embodiment.

For this reason, there is a relation of ESL1>ESL2>ESL3 among the equivalent series inductance ESL1 of the capacitor composed of the first internal electrode 31 and the second internal electrode 41, the equivalent series inductance ESL2 of the capacitor composed of the first internal electrode 33 and the second internal electrode 41, and the equivalent series inductance ESL3 of the capacitor composed of the first internal electrode 35 and the second internal electrode 41. Therefore, a relation of fr1<fr2<fr3 holds among the self-resonant frequency fr1 of the capacitor composed of the first internal electrode 31 and the second internal electrode 41, the self-resonant frequency fr2 of the capacitor composed of the first internal electrode 33 and the second internal electrode 41, and the self-resonant frequency fr3 of the capacitor composed of the first internal electrode 35 and the second internal electrode 41, whereby low impedance is achieved over a wide frequency band, as shown in FIG. 4. FIG. 4 is a graph showing an impedance ($\Omega$) characteristic against frequency (Hz) of the multilayer capacitor C1 of the first embodiment. In the graph shown in FIG. 4 the horizontal axis represents frequency (Hz) and the vertical axis represents impedance ($\Omega$).

The second internal electrode 41 includes the interconnection portions 43a, 43b connecting between the second main electrode portions 41a, 41b, 41c and the width of the interconnection portions 43a, 43b is smaller than the width of the second main electrode portions 41a, 41b, 41c. For this reason, the second main electrode portions 41a, 41b, and 41c are magnetically separated from each other and the self-resonant frequencies fr1, fr2, fr3 by the respective capacitance components $C1_1$, $C1_2$, $C1_3$ are also further separated. As a result of this configuration, the impedance is lowered over a wider band in the multilayer capacitor C1.

Figure 5:
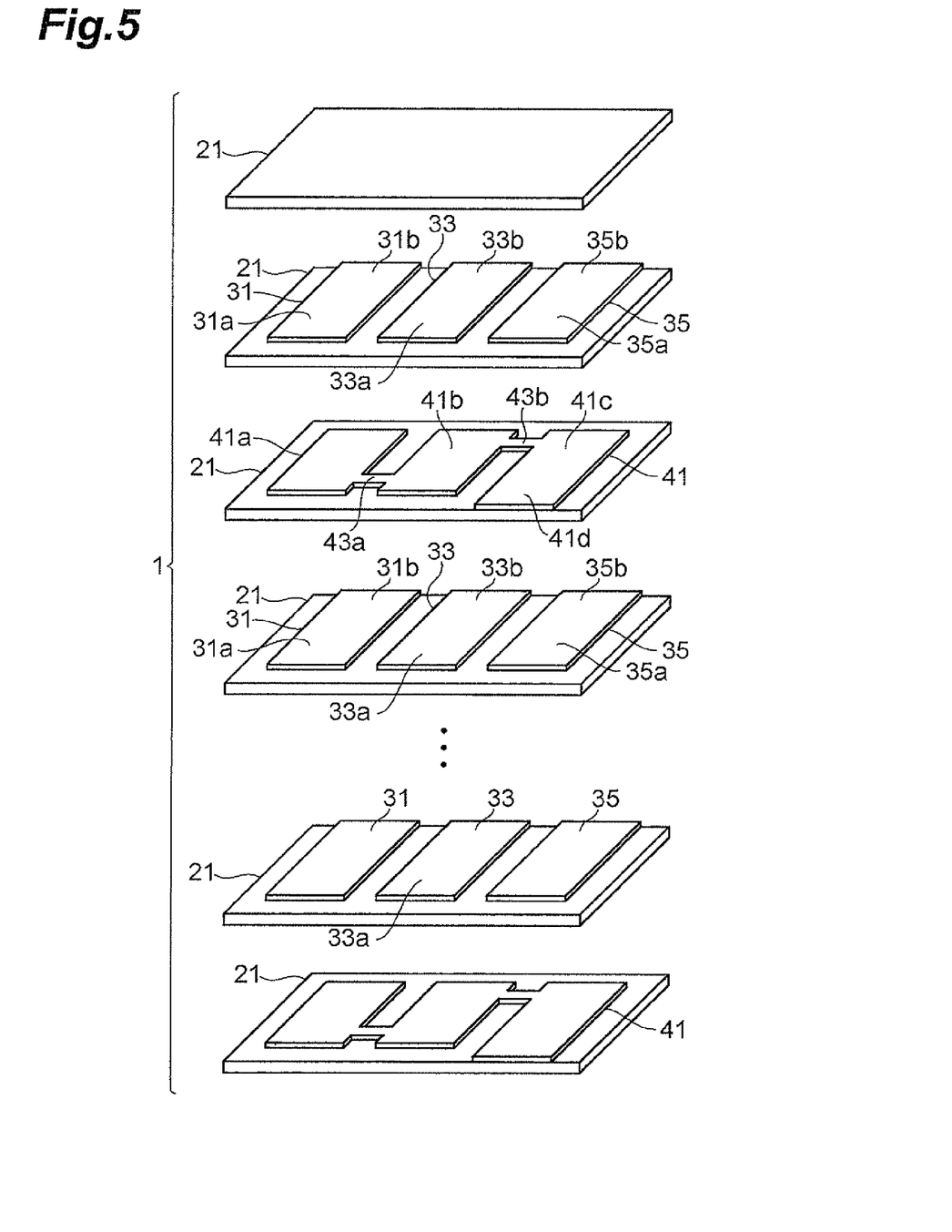
FIG. 5 is an exploded perspective view of a capacitor element body included in a multilayer capacitor according to a modification example of the first embodiment.
Figure 6:
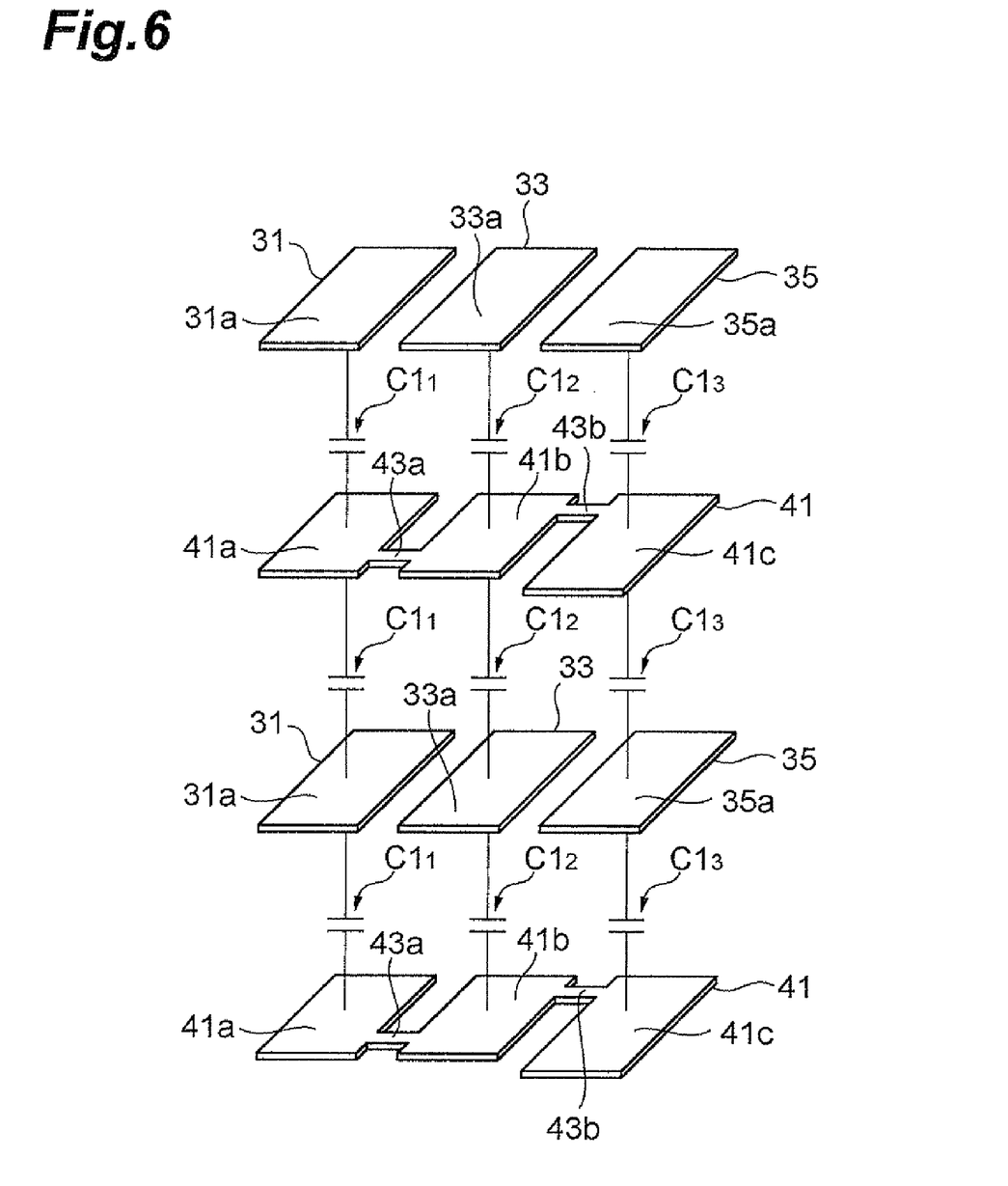
FIG. 6 is a drawing for explaining capacitance components formed by first internal electrodes and second internal electrodes.

The following will describe a modification example of the multilayer capacitor C1 according to the first embodiment, based on FIGS. 5 and 6. FIG. 5 is an exploded perspective view of the capacitor element body included in the multilayer capacitor according to the modification example of the first embodiment. FIG. 6 is a drawing for explaining capacitance components formed by the first internal electrodes and the second internal electrodes. The present modification example is different in the positions of the interconnection portions 43a, 43b from the multilayer capacitor C1 of the first embodiment.

In the present modification example, the interconnection portion 43a connects a part of the second main electrode portion 41a nearer to the second end face 5, to a part of the second main electrode portion 41b nearer to the second end face 5. The interconnection portion 43b connects a part of the second main electrode portion 41b nearer to the first end face 4, to a part of the second main electrode portion 41c nearer to the first end face 4. The interconnection portion 43a and the interconnection portion 43b are located at different positions in the direction in which the first end face 4 and the second end face 5 are opposed.

Since in this configuration an electric current flows in a meandering path to the second terminal electrode 13, it further increases the equivalent series inductance ESL1 of the capacitor composed of the first internal electrode 31 and the second internal electrode and the equivalent series inductance ESL2 of the capacitor composed of the first internal electrode 33 and the second internal electrode. Therefore, it results in varying the self-resonant frequency fr1 of the capacitor composed of the first internal electrode 31 and the second internal electrode and the self-resonant frequency fr2 of the capacitor composed of the first internal electrode 33 and the second internal electrode, thereby changing the frequency characteristic of impedance. As in this case, the frequency characteristic of impedance can be adjusted and controlled by changing the positions of the interconnection portions 43a, 43b.

Second Embodiment

Figure 7:
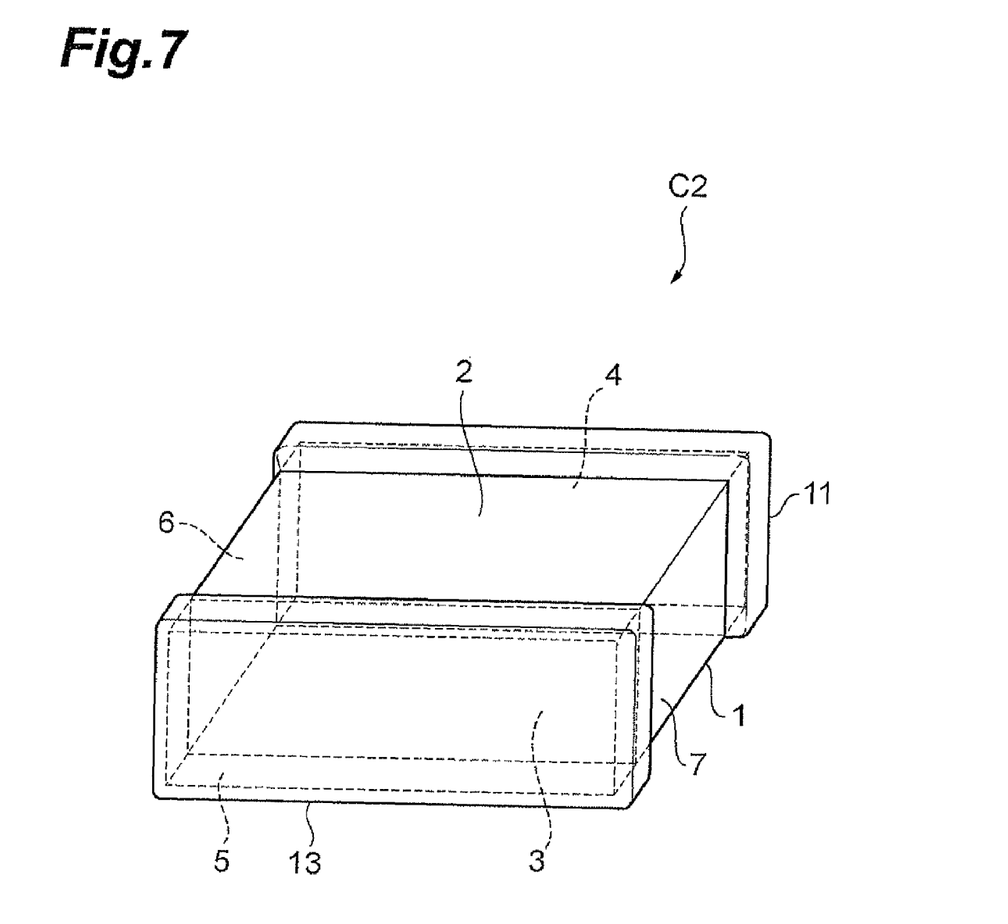
FIG. 7 is a schematic perspective view of a multilayer capacitor according to the second embodiment.
Figure 8:
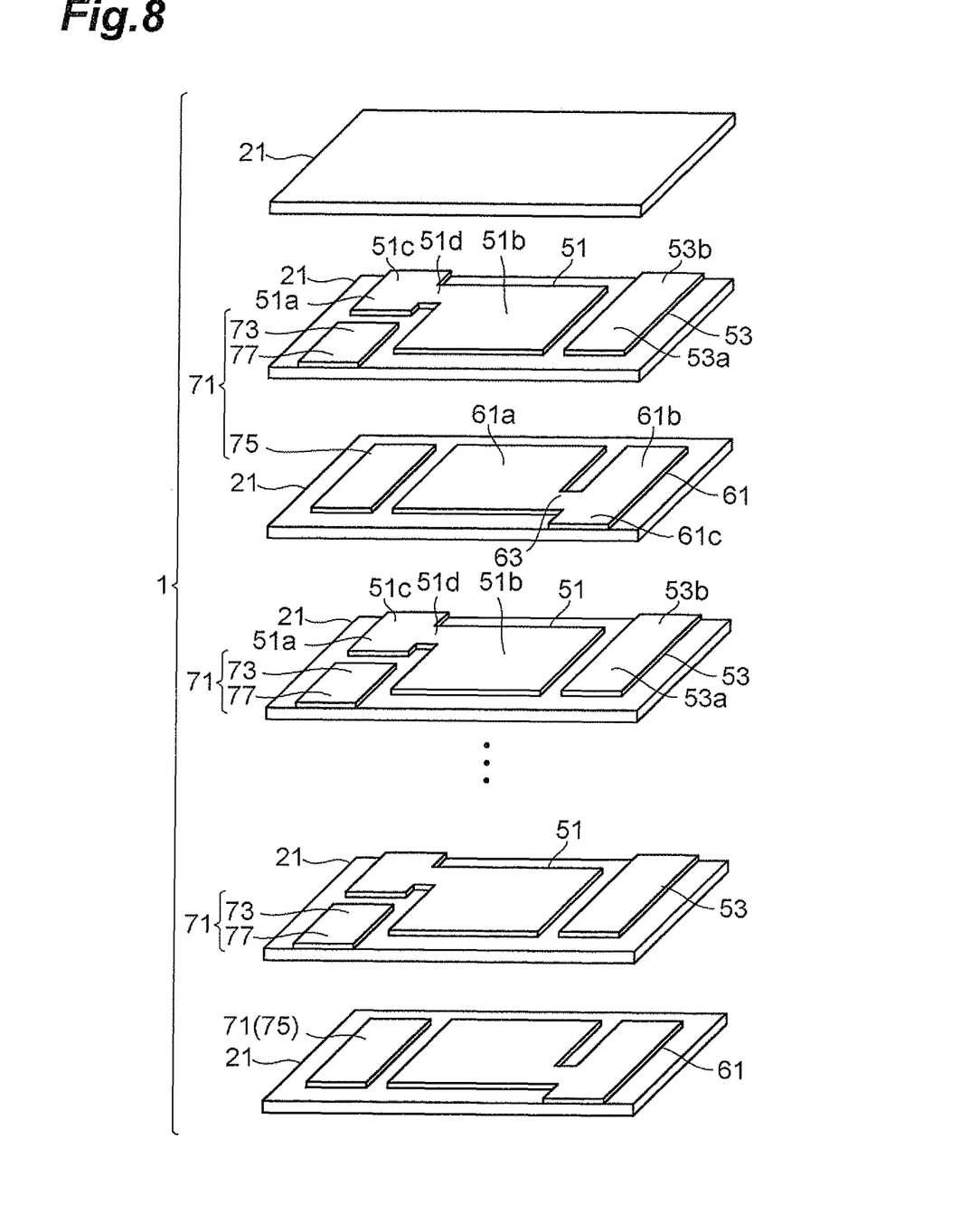
FIG. 8 is an exploded perspective view of a capacitor element body included in the multilayer capacitor according to the second embodiment.
Figure 9:
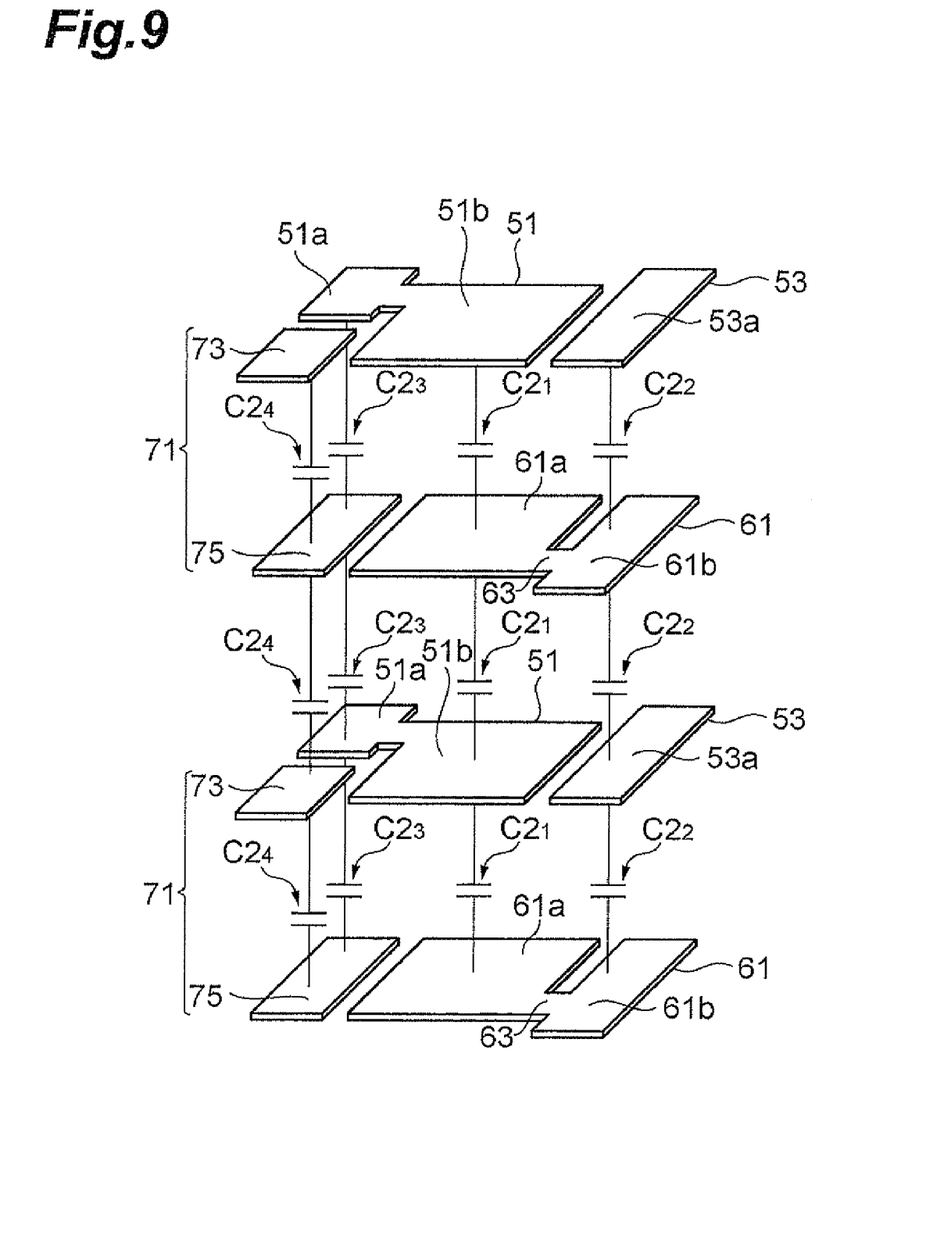
FIG. 9 is a drawing for explaining capacitance components formed by first internal electrodes, second internal electrodes, and third internal electrodes.

A configuration of a multilayer capacitor C2 according to the second embodiment will be described below on the basis of FIGS. 7 to 9. FIG. 7 is a schematic perspective view of the multilayer capacitor according to the second embodiment. FIG. 8 is an exploded perspective view of the capacitor element body included in the multilayer capacitor according to the second embodiment. FIG. 9 is a drawing for explaining capacitance components formed by first internal electrodes, second internal electrodes, and third internal electrodes.

The multilayer capacitor C2, as shown in FIG. 7, has the capacitor element body 1, the first terminal electrode 11 disposed on one end side of the capacitor element body 1, and the second terminal electrode 13 disposed on the other end side of the capacitor element body 1.

The capacitor element body 1, as shown in FIG. 8, has a plurality of dielectric layers 21, a plurality of first internal electrodes 51, 53, second internal electrodes 61, and third internal electrodes 71. The capacitor element body 1 has a structure in which the plurality of first internal electrodes 51, 53 and the second internal electrodes 61 are laminated as opposed to each other with the dielectric layer 21 in between. The first internal electrodes 51, 53 and the second internal electrodes 61 are alternately arranged in the lamination direction of the dielectric layers 21, i.e., in the direction in which the first and second principal faces 2, 3 are opposed, in the capacitor element body 1. In the capacitor element body 1 the third internal electrodes 71 are laminated as opposed to the first internal electrodes 51 with the dielectric layer 21 in between.

Each set of first internal electrodes 51 and 53 are located in an identical layer, while having a space between them. The plurality of first internal electrodes 51, 53 are arranged in an order of the first internal electrode 51 and the first internal electrode 53 in the direction from the third end face 6 to the fourth end face 7. Each first internal electrode 51 or 53 is made of the aforementioned electroconductive material which is usually used for internal electrodes of multilayer electric elements. Each first internal electrode 51 or 53 is comprised of a sintered body of an electroconductive paste containing the foregoing electroconductive material.

Each first internal electrode 51 includes first main electrode portions 51a and 51b of a rectangular shape, a first lead portion 51c extending from the first main electrode portion 51a to the first end face 4 so that its end is exposed in the first end face 4, and an interconnection portion 51d connecting between the first main electrode portion 51a and the first main electrode portion 51b. The first lead portion 51c extends from an end of the first main electrode portion 51a on the first end face 4 side to the first end face 4. The first main electrode portions 51a, 51b, the first lead portion 51c, and the interconnection portion 51d are integrally formed.

Each first internal electrode 53 includes a first main electrode portion 53a of a rectangular shape, and a first lead portion 53b extending from the first main electrode portion 53a to the first end face 4 so that its end is exposed in the first end face 4. The first lead portion 53b extends from an end of the first main electrode portion 53a on the first end face 4 side to the first end face 4. The first main electrode portion 53a and the first lead portion 53b are integrally formed.

The first terminal electrode 11 is formed so as to cover all the exposed portions of the respective first lead portions 51c and 53b in the first end face 4 and each first lead portion 51c or 53b is directly connected to the first terminal electrode 11. This makes the first internal electrodes 51 and 53 physically and electrically connected to the first terminal electrode 11.

The second internal electrodes 61 are located in layers different from those of the first internal electrodes 51, 53. Each second internal electrode 61 is opposed to the first internal electrodes 51, 53 (first main electrode portions 51a, 53a) with the dielectric layer 21 in between. The second internal electrodes 61 are also made of the aforementioned electroconductive material which is usually used for internal electrodes of multilayer electric elements. Each second internal electrode 61 is comprised of a sintered body of an electroconductive paste containing the foregoing electroconductive material. Each second internal electrode 61 includes second main electrode portions 61a and 61b of a rectangular shape, and a second lead portion 61c extending from the second main electrode portion 61b to the second end face 5 so that its end is exposed in the second end face 5.

The second main electrode portions 61a and 61b are arranged in an order of the second main electrode portion 61a and the second main electrode portion 61b in the direction from the third end face 6 to the fourth end face 7. The second lead portion 61c extends from an end of the second main electrode portion 61b on the second end face 5 side to the second end face 5. The second main electrode portions 61a, 61b and the second lead portion 61c are integrally formed. The second terminal electrode 13 is formed so as to cover all the exposed portions of the respective second lead portions 61c in the second end face 5 and each second lead portion 61c is directly connected to the second terminal electrode 13.

Each second internal electrode 61 further includes an interconnection portion 63. The interconnection portion 63 connects between the second main electrode portion 61a and the second main electrode portion 61b. More specifically, the interconnection portion 63 connects a part of the second main electrode portion 61a nearer to the second end face 5, to a part of the second main electrode portion 61b nearer to the second end face 5. The interconnection portion 63 is formed integrally with the second main electrode portions 61a, 61b and the second lead portion 61c. This makes the second internal electrodes 61 physically and electrically connected to the second terminal electrode 13. The interconnection portion 63 is opposed to none of the first internal electrodes 51 and 53 and thus has no overlap region with the first internal electrodes 51, 53 when viewed from the lamination direction of the dielectric layers 21 (the direction in which the first and second principal faces 2, 3 are opposed).

The width of the interconnection portion 63 is smaller than the width of each second main electrode portion 61a or 61b. The width of the interconnection portion 63 is a length (width) of the interconnection portion 63 in the direction in which the first end face 4 and the second end face 5 are opposed, and the width of each second main electrode portion 61a or 61b is also a length (width) of each second main electrode portion 61a or 61b in the direction in which the first end face 4 and the second end face 5 are opposed.

Each third internal electrode 71 includes a third main electrode portion 73 of a rectangular shape, a third intermediate electrode portion 75, and a third lead portion 77 extending from the third main electrode portion 73 to the second end face 5 so that its end is exposed in the second end face 5. The third main electrode portion 73 is located in the same layer as the first internal electrodes 51 and 53, while having a space relative to the first internal electrodes 51 and 53. The third intermediate electrode portion 75 is located in the same layer as the second internal electrode 61, while having a space relative to the second internal electrode 61. The third intermediate electrode portion 75 is opposed to the first main electrode portion 51a of the first internal electrode 51 and the third main electrode portion 73 with the dielectric layer 21 in between. The third main electrode portion 73 and the third lead portion 77 are integrally formed. The third internal electrodes 71 are also made of the aforementioned electroconductive material which is usually used for internal electrodes of multilayer electric elements. Each third internal electrode 71 is comprised of a sintered body of an electroconductive paste containing the foregoing electroconductive material.

The second terminal electrode 13 is formed so as to cover all the exposed portions of the respective third lead portions 77 in the second end face 5 and each third lead portion 77 is directly connected to the second terminal electrode 13. This makes the third main electrode portions 73 of the third internal electrodes 71 and the second internal electrodes 61 physically and electrically connected to the second terminal electrode 13. The third intermediate electrode portions 75 are not directly connected to the first and second terminal electrodes 11, 13.

The first main electrode portion 51b of each first internal electrode 51 and the second main electrode portion 61a of each second internal electrode 61 include a region in which they are opposed to each other in the direction in which the first and second principal faces 2, 3 are opposed, with at least one dielectric layer 21 as a part of the capacitor element body 1 in between. The first main electrode portion 51b of each first internal electrode 51 and the second main electrode portion 61a of each second internal electrode 61 have a mutually overlapping region when viewed from the direction in which the first and second principal faces 2, 3 are opposed. Therefore, an overlap portion of the dielectric layer 21 with the first main electrode portion 51b and the second main electrode portion 61a is a region which substantially produces one capacitance component $C2_1$, as shown in FIG. 9. A first internal electrode 51 and a second internal electrode 61 constitute one capacitor.

The first main electrode portion 53a of each first internal electrode 53 and the second main electrode portion 61b of each second internal electrode 61 include a region in which they are opposed to each other in the direction in which the first and second principal faces 2, 3 are opposed, with at least one dielectric layer 21 as a part of the capacitor element body 1 in between. The first main electrode portion 53a of each first internal electrode 53 and the second main electrode portion 61b of each second internal electrode 61 have a mutually overlapping region when viewed from the direction in which the first and second principal faces 2, 3 are opposed. Therefore, an overlap portion of the dielectric layer 21 with the first main electrode portion 53a and the second main electrode portion 61b is a region which substantially produces one capacitance component $C2_2$. A first internal electrode 53 and a second internal electrode 61 constitute one capacitor.

The first main electrode portion 51a of each first internal electrode 51 and the third intermediate electrode portion 75 of each third internal electrode 71 include a region in which they are opposed to each other in the direction in which the first and second principal faces 2, 3 are opposed, with at least one dielectric layer 21 as a part of the capacitor element body 1 in between. The first main electrode portion 51a of each first internal electrode 51 and the third intermediate electrode portion 75 of each third internal electrode 71 have a mutually overlapping region when viewed from the direction in which the first and second principal faces 2, 3 are opposed. Therefore, an overlap portion of the dielectric layer 21 with the first main electrode portion 51a and the third intermediate electrode portion 75 is a region which substantially produces one capacitance component $C2_3$.

The third main electrode portion 73 of each third internal electrode 71 and the third intermediate electrode portion 75 of the third internal electrode 71 include a region in which they are opposed to each other in the direction in which the first and second principal faces 2, 3 are opposed, with at least one dielectric layer 21 as a part of the capacitor element body 1 in between. The third main electrode portion 73 of each third internal electrode 71 and the third intermediate electrode portion 75 of the third internal electrode 71 have a mutually overlapping region when viewed from the direction in which the first and second principal faces 2, 3 are opposed. Therefore, an overlap portion of the dielectric layer 21 with the third main electrode portion 73 and the third intermediate electrode portion 75 is a region which substantially produces one capacitance component $C2_4$.

As described above, the third main electrode portion 73 and the third intermediate electrode portion 75 are arranged with the insulator layer 21 in between so that the two capacitance components $C2_3$ and $C2_4$ are formed between the first internal electrode 51 and the third internal electrode 71. The two capacitance components $C2_3$, $C2_4$ are connected in series. A first internal electrode 51 and two third internal electrodes 71 constitute two series-connected capacitors.

In the multilayer capacitor C2 of the present embodiment, the first internal electrodes 51 and 53 are located in an identical layer and arranged in juxtaposition in the direction from the third end face 6 to the fourth end face 7. For this reason, the first lead portion 51c of the first internal electrode 51 and the first lead portion 53b of the first internal electrode 53 are formed at different positions.

There is a relation of D4>D5 between the distance D4 from the first lead portion 51c of the first internal electrode 51 to the second lead portion 61c of the second internal electrode 61 in the capacitance component $C2_1$ and the distance D5 from the first lead portion 53b of the first internal electrode 53 to the second lead portion 61c of the second internal electrode 61 in the capacitance component $C2_2$. The distance D4 or D5 between each first lead portion 51c or 53b and the second lead portion 61c is a shortest direct distance from a connection point between each first lead portion 51c or 53b and the first terminal electrode 11 to a connection point between the second lead portion 61c and the second terminal electrode 13.

For this reason, there is a relation of ESL4>ESL5 between the equivalent series inductance ESL4 of the capacitor composed of the first internal electrode 51 and the second internal electrode 61 and the equivalent series inductance ESL5 of the capacitor composed of the first internal electrode 53 and the second internal electrode 61. Therefore, a relation of fr4<fr5 holds between the self-resonant frequency fr4 of the capacitor composed of the first internal electrode 51 and the second internal electrode 61 and the self-resonant frequency fr5 of the capacitor composed of the first internal electrode 53 and the second internal electrode 61.

A total capacitance component of the two capacitance components $C2_3$, $C2_4$ formed by the first internal electrode 51 and the third internal electrode 71 and the capacitance component $C2_2$ formed by the first internal electrode 53 and the second internal electrode 61 have the following relation:

total capacitance component of two capacitance components $C2_3$, $C2_4$<capacitance component $C2_2$. Then a relation of fr5<fr6 holds between the self-resonant frequency fr5 of the capacitor composed of the first internal electrode 53 and the second internal electrode 61 and the self-resonant frequency fr6 of the capacitor composed of the first internal electrode 51 and the third internal electrode 71.

From the above, there is also the relation of fr4<fr5<fr6 in the second embodiment. Since the two series-connected capacitors are formed by the first internal electrode 51 and the third internal electrode 71 through the third intermediate electrode portion 75, low impedance is achieved over a wider frequency band.

The second internal electrode 61 includes the second main electrode portions 61a and 61b forming the respective capacitance components corresponding to the respective first internal electrodes 51 and 53, and the interconnection portion 63 connecting between the second main electrode portions 61a, 61b, and the width of the interconnection portion 63 is smaller than the width of the second main electrode portions 61a, 61b. For this reason, the second main electrode portions 61a and 61b are magnetically separated from each other and the self-resonant frequencies fr4, fr5 by the respective capacitance components $C2_1$, $C2_2$ are also further separated. As a result of this configuration, the impedance is lowered over a wider band in the multilayer capacitor C2.

Figure 10:
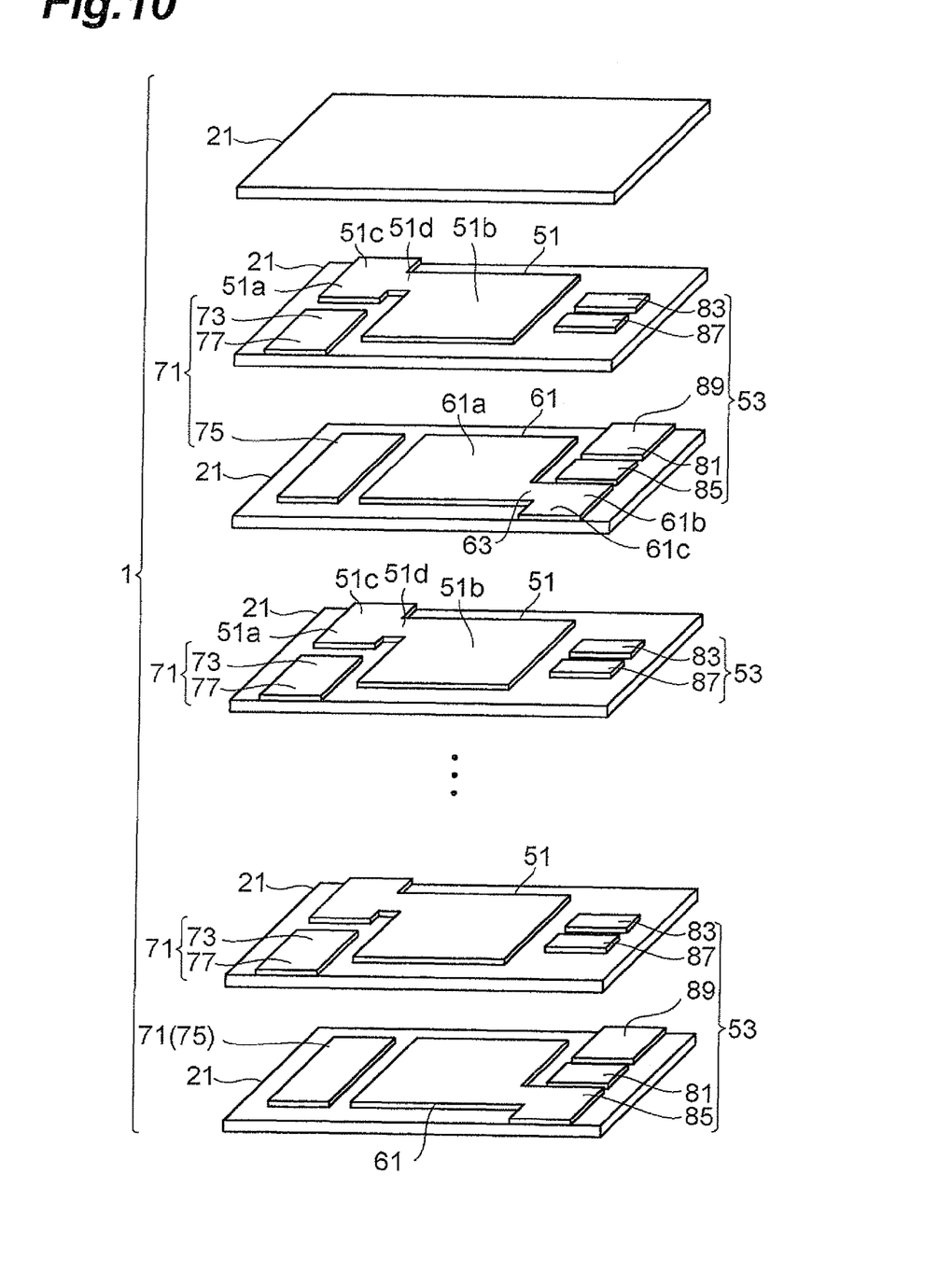
FIG. 10 is an exploded perspective view of a capacitor element body included in a multilayer capacitor according to a modification example of the second embodiment.
Figure 11:
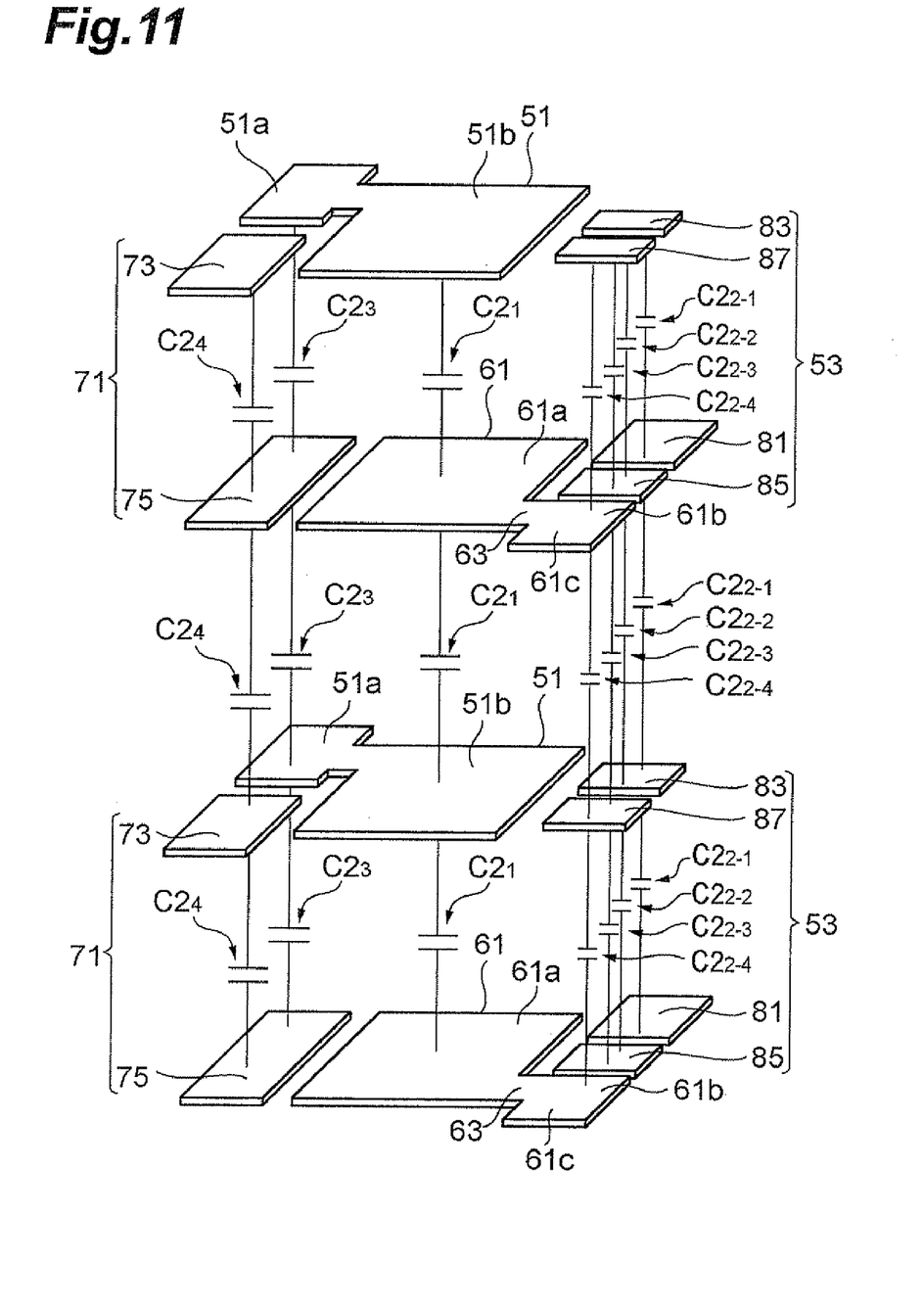
FIG. 11 is a drawing for explaining capacitance components formed by first internal electrodes, second internal electrodes, and third internal electrodes.

The following will describe a modification example of the multilayer capacitor C2 according to the second embodiment, based on FIGS. 10 and 11. FIG. 10 is an exploded perspective view of the capacitor element body included in the multilayer capacitor according to the modification example of the second embodiment. FIG. 11 is a drawing for explaining capacitance components formed by the first internal electrodes, second internal electrodes, and third internal electrodes. The present modification example is different in the configuration of the first internal electrodes 53 from the multilayer capacitor C2 of the second embodiment.

Each first internal electrode 53, as shown in FIG. 10, includes a first main electrode portion 81 of a rectangular shape, a plurality of first intermediate electrode portions 83, 85, and 87, and a first lead portion 89 extending from the first main electrode portion 81 to the first end face 4 so that its end is exposed in the first end face 4. The first main electrode portion 81 and the first lead portion 89 are integrally formed.

The first main electrode portion 81 is located in the same layer as the second internal electrode 61, while having a space relative to the second internal electrode 61. The first intermediate electrode portions 83 and 87 are located in the same layer as the first internal electrode 51, while having a space relative to the first internal electrode 51. The first intermediate electrode portion 85 is located in the same layer as the second internal electrode 61 and the first main electrode portion 81, while having a space relative to the second internal electrode 61 and the first main electrode portion 81. The first intermediate electrode portion 83 is opposed to the first main electrode portion 81 and the first intermediate electrode portion 85 of the first internal electrode 53 with the dielectric layer 21 in between. The first intermediate electrode portion 85 is opposed to the first intermediate electrode portion 83 and the first intermediate electrode portion 87 with the dielectric layer 21 in between. The first intermediate electrode portion 87 is opposed to the first intermediate electrode portion 85 and the second main electrode portion 61b of the second internal electrode 61 with the dielectric layer 21 in between.

The first lead portion 89 is directly connected to the first terminal electrode 11. This makes the first main electrode portion 81 of each first internal electrode 53 physically and electrically connected to the first terminal electrode 11. Each first intermediate electrode portion 83, 85, or 87 is not directly connected to the first and second terminal electrodes 11, 13.

The width of the interconnection portion 63 connecting between the second main electrode portion 61a and the second main electrode portion 61b is smaller than the width of the second main electrode portion 61a and approximately equal to the width of the second main electrode portion 61b.

The first main electrode portion 81 of the first internal electrode 53 and the first intermediate electrode portion 83 of the first internal electrode 53 include a region in which they are opposed to each other in the direction in which the first and second principal faces 2, 3 are opposed, with at least one dielectric layer 21 as a part of the capacitor element body 1 in between. The first main electrode portion 81 of the first internal electrode 53 and the first intermediate electrode portion 83 of the first internal electrode 53 have a mutually overlapping region when viewed from the direction in which the first and second principal faces 2, 3 are opposed. Therefore, as shown in FIG. 11, an overlap portion of the dielectric layer 21 with the first main electrode portion 81 and the first intermediate electrode portion 83 is a region which substantially produces one capacitance component $C2_{2-1}$.

The first intermediate electrode portion 83 and the first intermediate electrode portion 85 include a region in which they are opposed to each other in the direction in which the first and second principal faces 2, 3 are opposed, with at least one dielectric layer 21 as a part of the capacitor element body 1 in between. The first intermediate electrode portion 83 and the first intermediate electrode portion 85 have a mutually overlapping region when viewed from the direction in which the first and second principal faces 2, 3 are opposed. Therefore, an overlap portion of the dielectric layer 21 with the first intermediate electrode portion 83 and the first intermediate electrode portion 85 is a region which substantially produces one capacitance component $C2_{2-2}$.

The first intermediate electrode portion 85 and the first intermediate electrode portion 87 include a region in which they are opposed to each other in the direction in which the first and second principal faces 2, 3 are opposed, with at least one dielectric layer 21 as a part of the capacitor element body 1 in between. The first intermediate electrode portion 85 and the first intermediate electrode portion 87 have a mutually overlapping region when viewed from the direction in which the first and second principal faces 2, 3 are opposed. Therefore, an overlap portion of the dielectric layer 21 with the first intermediate electrode portion 85 and the first intermediate electrode portion 87 is a region which substantially produces one capacitance component $C2_{2-3}$.

The first intermediate electrode portion 87 and the second main electrode portion 61b of the second internal electrode 61 include a region in which they are opposed to each other in the direction in which the first and second principal faces 2, 3 are opposed, with at least one dielectric layer 21 as a part of the capacitor element body 1 in between. The first intermediate electrode portion 87 and the second main electrode portion 61b of the second internal electrode 61 have a mutually overlapping region when viewed from the direction in which the first and second principal faces 2, 3 are opposed. Therefore, an overlap portion of the dielectric layer 21 with the first intermediate electrode portion 87 and the second main electrode portion 61b is a region that substantially produces one capacitance component $C2_{2-4}$.

As described above, the first main electrode portion 81 and the first intermediate electrode portions 83, 85, 87 are arranged with the insulator layer 21 in between so that the four capacitance components $C2_{2-1}$, $C2_{2-2}$, $C2_{2-3}$, and $C2_{2-4}$ are formed between the first internal electrode 53 and the second internal electrode 61 (second main electrode portion 61b). The four capacitance components $C2_{2-1}$, $C2_{2-2}$, $C2_{2-3}$, and $C2_{2-4}$ are connected in series. A first internal electrode 53 and a second internal electrode 61 (second main electrode portion 61b) constitute four series-connected capacitors.

In the present modification example, the capacitance component formed by the first internal electrode 53 and the second internal electrode 61 (second main electrode portion 61b) is divided into the four series-connected capacitance components $C2_{2-1}$, $C2_{2-2}$, $C2_{2-3}$, and $C2_{2-4}$ and the total capacitance component of the four capacitance components $C2_{2-1}$, $C2_{2-2}$, $C2_{2-3}$, and $C2_{2-4}$ is extremely smaller than the capacitance in the case where the aforementioned capacitance component is not divided. Therefore, the impedance is lowered over an extremely wide band.

The above described the preferred embodiments of the present invention, but it should be noted that the present invention is by no means limited to the above-described embodiments and can be modified in many ways without departing from the spirit and scope of the invention. For example, the shapes of the respective internal electrodes, the forming positions, shapes, and the number of the lead portions of the respective internal electrodes, etc. are not limited specifically to those in the above embodiments.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising:
   a laminated body in which a first internal electrode and a second internal electrode are laminated as opposed to each other with a dielectric layer in between;
   a first terminal electrode disposed on one end side of the laminated body; and
   a second terminal electrode disposed on the other end side of the laminated body,
   wherein the first internal electrode comprises a plurality of types of first internal electrodes, and each type of first internal electrode includes a first main electrode portion, and a first lead portion extending from the first main electrode portion to one end of the laminated body and connected directly to the first terminal electrode, wherein the second internal electrode includes a plurality of second main electrode portions forming respective capacitance components with the respective types of first internal electrodes, an interconnection portion connecting between each pair of the second main electrode portions, and a second lead portion extending from one second main electrode portion out of the plurality of second main electrode portions to the other end of the laminated body and connected directly to the second terminal electrode, wherein positions of the first lead portions of the respective types of first internal electrodes are different from each other and distances from the first lead portions of the respective types of first internal electrodes to the second lead portion are different from each other, and wherein a width of the interconnection portion is smaller than a width of at least one second main electrode portion out of the plurality of second main electrode portions.

2. The multilayer capacitor according to claim 1, wherein at least one type of first internal electrode further includes a first intermediate electrode portion which is not directly connected to the first terminal electrode, and wherein the first main electrode portion and the first intermediate electrode portion are arranged with the dielectric layer in between so that a plurality of series-connected capacitance components are formed between the first main electrode portion and the first intermediate electrode portion.

3. The multilayer capacitor according to claim 2, wherein the laminated body comprises a third internal electrode laminated therein, the third internal electrode including a third main electrode portion, a third lead portion extending from the third main electrode portion to the other end of the laminated body and connected directly to the second terminal electrode, and a third intermediate electrode portion not directly connected to the second terminal electrode, and wherein the third main electrode portion and the third intermediate electrode portion are arranged with the dielectric layer in between so that a plurality of series-connected capacitance components are formed between at least one type of first internal electrode and the third main electrode portion.

4. The multilayer capacitor according to claim 1, wherein the laminated body comprises a third internal electrode laminated therein, the third internal electrode including a third main electrode portion, a third lead portion extending from the third main electrode portion to the other end of the laminated body and connected directly to the second terminal electrode, and a third intermediate electrode portion not directly connected to the second terminal electrode, and wherein the third main electrode portion and the third intermediate electrode portion are arranged with the dielectric layer in between so that a plurality of series-connected capacitance components are formed between at least one type of first internal electrode and the third main electrode portion.

* * * * *